(12) United States Patent
Hall et al.

(10) Patent No.: US 12,286,007 B2
(45) Date of Patent: Apr. 29, 2025

(54) THERMAL MANAGEMENT SYSTEM, AND VEHICLE

(71) Applicant: Scania CV AB, Södertälje (SE)

(72) Inventors: Ola Hall, Stockholm (SE); Martin Mohlin, Stockholm (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 17/917,115

(22) PCT Filed: Apr. 26, 2021

(86) PCT No.: PCT/SE2021/050381
§ 371 (c)(1),
(2) Date: Oct. 5, 2022

(87) PCT Pub. No.: WO2021/221550
PCT Pub. Date: Nov. 4, 2021

(65) Prior Publication Data
US 2023/0158883 A1    May 25, 2023

(30) Foreign Application Priority Data
Apr. 29, 2020    (SE) .................... 2050488-2

(51) Int. Cl.
*B60K 11/02* (2006.01)
*B60K 1/00* (2006.01)
(Continued)

(52) U.S. Cl.
CPC ............... *B60K 11/02* (2013.01); *B60K 1/00* (2013.01); *F01P 3/20* (2013.01); *F01P 5/10* (2013.01);
(Continued)

(58) Field of Classification Search
CPC .... B60K 11/02; B60K 1/00; B60K 2001/006; B60K 2001/003; B60K 2001/005;
(Continued)

(56) References Cited

U.S. PATENT DOCUMENTS 10,364,737 B2    7/2019   Roehm et al.
2004/0200443 A1  10/2004  Iinuma et al.
(Continued)

FOREIGN PATENT DOCUMENTS

CN    204140180 U    2/2015
CN    109362232 A    2/2019
(Continued)

OTHER PUBLICATIONS

Machine Translation of DE 102013226420 A1 PDF File Name: "DE102013226420A1_Machine_Translation.pdf".*
(Continued)

*Primary Examiner* — Grant Moubry
*Assistant Examiner* — Ruben Picon-Feliciano
(74) *Attorney, Agent, or Firm* — Moore & Van Allen PLLC; W. Kevin Ransom

(57) ABSTRACT

A vehicle thermal management system is disclosed comprising a first and a second coolant circuit each comprising a coolant pump. The first coolant circuit comprises a coolant duct configured to conduct coolant flow through a portion of the first coolant circuit, and an expansion tank connected to the coolant duct. The system further comprises a first connecting conduit connecting the second coolant circuit to the coolant duct, and valve controllable between a first state in which the valve hinders flow of fluid through the first connecting conduit, and a second state in which the valve allows flow of fluid through the first connecting conduit. The present disclosure further relates to a vehicle comprising a vehicle thermal management system.

20 Claims, 2 Drawing Sheets

(51) Int. Cl.
*F01P 3/20* (2006.01)
*F01P 5/10* (2006.01)

(52) U.S. Cl.
CPC ... *B60K 2001/006* (2013.01); *F01P 2005/105* (2013.01)

(58) Field of Classification Search
CPC F01P 3/20; F01P 5/10; F01P 2005/105; F01P 2050/24; F01P 2060/06; F01P 2060/08; F01P 2070/04; F01P 7/16; F01P 11/02; F01P 7/165; F01P 11/04; B60Y 2200/14
See application file for complete search history.

(56) References Cited

U.S. PATENT DOCUMENTS

| | | |
|---|---|---|
| 2008/0251303 A1 | 10/2008 | Rouaud et al. |
| 2010/0116458 A1 | 5/2010 | Kim |
| 2015/0251518 A1 | 9/2015 | Nemesh |
| 2016/0305306 A1 | 10/2016 | Oslislok et al. |
| 2017/0067389 A1 | 3/2017 | Cha et al. |
| 2018/0072130 A1 | 3/2018 | Kim |
| 2018/0178615 A1 | 6/2018 | Xia et al. |
| 2019/0176057 A1 | 6/2019 | Mendez et al. |
| 2019/0264600 A1 | 8/2019 | Loof et al. |

FOREIGN PATENT DOCUMENTS

| | | | | |
|---|---|---|---|---|
| CN | 210033609 U | | 2/2020 | |
| DE | 102013221447 A1 | | 5/2015 | |
| DE | 102013226420 A1 | * | 6/2015 | .......... F01P 11/0285 |
| DE | 102015111407 A1 | | 1/2017 | |
| DE | 102017011428 A1 | | 6/2018 | |
| EP | 2418112 A2 | | 2/2012 | |
| EP | 3301274 A1 | | 4/2018 | |
| FR | 2640315 A1 | | 6/1990 | |
| GB | 2561599 A | | 10/2018 | |
| JP | 10266856 A | | 10/1998 | |
| WO | 2007031670 A1 | | 3/2007 | |
| WO | 2015053684 A1 | | 4/2015 | |
| WO | 2015080659 A1 | | 6/2015 | |
| WO | 2017213573 A1 | | 12/2017 | |
| WO | WO-2018208208 A1 | * | 11/2018 | ......... B60H 1/00278 |
| WO | 2019203701 A1 | | 10/2019 | |

OTHER PUBLICATIONS

Scania CV AB, International Patent Application No. PCT/SE2021/050381, International Search Report, Jun. 2, 2021.
Scania CV AB, International Patent Application No. PCT/SE2021/050381, Written Opinion, Jun. 2, 2021.
Scania CV AB, Swedish Patent Application No. 2050488-2, Office Action, Dec. 2, 2020.
Scania CV AB, International Patent Application No. PCT/SE2021/050381, International Preliminary Report on Patentability, Oct. 27, 2022.
Scania CV AB, European Patent Application No. 21796079.8, Extended European Search Report, May 8, 2024.
Scania CV AB, Chinese Patent Application No. 202180029757.1, First Office Action, Apr. 26, 2024.
Guo, Ai, et al., "Modeling of PEMFC thermal management system for vehicle application", Power Technology, Dec. 20, 2014, vol. 38, No. 12, pp. 2278-2282.
Lin, Teng, et al., "Design and application of expansion tanks for bulldozers", Engineering Machinery, Feb. 10, 2017, vol. 48, No. 2, pp. 18-21.

* cited by examiner

THERMAL MANAGEMENT SYSTEM, AND VEHICLE

CROSS-REFERENCE TO RELATED APPLICATIONS

This application is a National Stage Patent Application (filed under 35 § U.S.C. 371) of PCT/SE2021/050381, filed Apr. 26, 2021, of the same title, which, in turn claims priority to Swedish Patent Application No. 2050488-2 filed Apr. 29, 2020, of the same title; the contents of each of which are hereby incorporated by reference.

FIELD OF THE INVENTION

The present disclosure relates to a vehicle thermal management system comprising a first and a second coolant circuit each comprising a coolant pump. The present disclosure further relates to a vehicle comprising a vehicle thermal management system.

BACKGROUND

Modern vehicles usually comprise several cooling circuits each arranged to cool a vehicle system such as a combustion engine, an electric propulsion system, a propulsion battery, a retarder, a waste heat recovery circuit, and the like. Such cooling circuits usually comprise a coolant pump and one or more radiators arranged to transfer heat from the cooling circuit to ambient air. Radiators are usually arranged at a front of a vehicle to be subjected to the air flow generated during driving of the vehicle. Moreover, radiators can be provided with one or more cooling fans arranged to blow air through the radiators. In this manner, an air flow through the radiators can be generated also when the vehicle is driving at low speed or is at stand still.

A problem associated with coolant circuits is that air may enter the circuit. Air in a coolant circuit reduces the efficiency of the coolant circuit, partly because air has a much lower specific heat capacity than coolant. Moreover, air inside a coolant circuit may harm components of the coolant circuit, such as the coolant pump of the coolant circuit.

Technical development has led to an increased number of systems and components packed into vehicles. For example, the current trend of electrification of vehicles has increased this number significantly. The increased number of systems and components packed into vehicles add costs and complexity to the vehicle. Moreover, the mounting, fitting, and access of the systems and components can be problematic due to the limited available space in vehicles.

Furthermore, the increased number of systems and components packed into vehicles has led to an increased number of coolant circuits arranged in vehicles. Each of these coolant circuits are usually arranged to cool a vehicle system or a set of vehicle systems, wherein each coolant circuit is arranged to operate in an independent manner relative to the other coolant circuits. This entails that each of the coolant circuits must be designed to have a capacity sufficient for cooling or heating at a respective peak power, which adds to the problems of added costs, complexity, and limited available space in vehicles.

Moreover, generally, on today's consumer market, it is an advantage if vehicles and their associated components, systems and arrangements have conditions and/or characteristics suitable for being manufactured and assembled in a cost-efficient manner.

SUMMARY OF THE INVENTION

It is an object of the present invention to overcome, or at least alleviate, at least some of the above-mentioned problems and drawbacks.

According to a first aspect of the invention, the object is achieved by a vehicle thermal management system comprising a first and a second coolant circuit each comprising a coolant pump. The first coolant circuit comprises a coolant duct configured to conduct coolant flow through a portion of the first coolant circuit and an expansion tank connected to the coolant duct. The system further comprises a first connecting conduit connecting the second coolant circuit to the coolant duct. The system comprises a valve controllable between a first state in which the valve hinders flow of fluid through the first connecting conduit and a second state in which the valve allows flow of fluid through the first connecting conduit to deair the second coolant circuit via the expansion tank.

Since the thermal management system comprises the first connecting conduit and the valve controllable between the first and second states, a system is provided having conditions for deairing the second coolant circuit via the expansion tank simply by controlling the valve to the second state. Moreover, since the expansion tank is connected to the coolant duct, the first coolant circuit is also deaired via the expansion tank. In this manner, it can be ensured that the coolant pumps of the first and second coolant circuits are fed with coolant and not air. Thereby, damage of the coolant pumps can be avoided.

Moreover, a system is provided in which two coolant circuits can be deaired using only one expansion tank, while conditions are provided for isolating the second coolant circuit from the first coolant circuit when wanted simply by controlling the valve to the first state. In this manner, the first and second coolant circuits can be allowed to operate at different temperature levels when wanted simply by controlling the valve to the first state.

Furthermore, since the two coolant circuits can be deaired using only one expansion tank, a less costly and complex thermal management system is provided. Accordingly, a thermal management system is provided having conditions and/or characteristics suitable for being manufactured and assembled in a cost-efficient manner. Moreover, a thermal management system is provided having conditions for utilizing the available space in a vehicle in a more efficient manner.

In addition, a system is provided having conditions for connecting the second coolant circuit to the first coolant circuit so as to at least partially mix coolant of the first and second coolant circuits when wanted simply by controlling the valve to the second state. In this manner, heat energy can be transferred from one of the first and second coolant circuits to the other of the first and second coolant circuits. Thereby, a system is provided capable of transferring heat between the first and second coolant circuits and components and systems thermally connected to the respective first and second coolant circuits. As a result thereof, a system is provided capable of managing heat in an improved manner.

Accordingly, a vehicle thermal management system is provided overcoming, or at least alleviating, at least some of the above-mentioned problems and drawbacks. As a result, the above-mentioned object is achieved.

Optionally, the first connecting conduit comprises a first end connected to the coolant duct and a second end connected to the second coolant circuit, and wherein the first end is arranged above the second end when the system is mounted in an intended mounting position on a vehicle. Thereby, a system is provided having improved conditions for deairing the second coolant circuit via the first connecting conduit. Moreover, due to these features, filling of coolant into the system can be facilitated, for example during assembly, service, and repair of the system.

Optionally, the first connecting conduit is routed such that an intended flow direction through the first connecting conduit has a vector component parallel to a local gravity vector along the full length of the first connecting conduit when the system is mounted in an intended mounting position on a vehicle. Thereby, it is ensured that air bubbles can be transported along the full length of the first connecting conduit in an efficient manner due to gravity and the density difference between the air bubbles and the coolant. Moreover, due to these features, filling of coolant into the system is facilitated, for example during assembly, service, and repair of the system.

Optionally, the first connecting conduit comprises a second end connected to the second coolant circuit via a connection arranged above the coolant pump of the second coolant circuit when the system is mounted in an intended mounting position on a vehicle. Thereby, a system is provided having conditions for deairing the coolant pump of the second coolant circuit in an efficient manner. Thereby, damages of the coolant pump of the second coolant circuit can be avoided. In addition, it can be ensured that coolant is reaching the coolant pump of the second coolant circuit when the system is filled with coolant, for example during assembly, service, and repair of the system.

Optionally, the second coolant circuit comprises a conduit section between the connection and the coolant pump of the second coolant circuit, and wherein the conduit section is routed such that an intended flow direction through the conduit section has a vector component parallel to a local gravity vector along the full length of the conduit section when the system is mounted in an intended mounting position on a vehicle. Thereby, it is ensured that air bubbles can be transported from the coolant pump of the second coolant circuit in an efficient manner along the full length of the conduit section due to gravity and the density difference between the air bubbles and the coolant. In this manner, a system is provided having further improved conditions for deairing the coolant pump of the second coolant circuit. In addition, it can be ensured that coolant is reaching the coolant pump of the second coolant circuit when the system is filled with coolant, for example during assembly, service, and repair of the system.

Optionally, the first connecting conduit comprises a second end connected to the second coolant circuit via a connection arranged upstream of the coolant pump of the second coolant circuit relative to an intended flow direction through the second coolant circuit. Thereby, a system is provided having conditions for deairing an inlet of the coolant pump of the second coolant circuit simply by controlling the valve to the second state. In this manner, damages of the coolant pump of the second coolant circuit can be avoided. Moreover, it can be ensured that coolant is reaching the coolant pump of the second coolant circuit when the system is filled with coolant, for example during assembly, service, and repair of the system.

In addition, it can be ensured that the inlet of the coolant pump of the first coolant circuit and the inlet of the coolant pump of the second coolant circuit have the same static pressure, or at least substantially the same static pressure, at least when the valve is in the second state.

Optionally, the coolant duct comprises an expansion tank connection fluidly connecting the coolant duct to the expansion tank, and wherein the first connecting conduit is connected to the coolant duct at a location below the expansion tank connection when the system is mounted in an intended mounting position on a vehicle. Thereby, air bubbles transported from the second coolant circuit via the first connecting conduit can be transported through the coolant duct to the expansion tank connection in an efficient manner due to gravity and the density difference between the air bubbles and the coolant.

Optionally, the coolant duct comprises an inlet and an outlet each connected to the first coolant circuit, and wherein the coolant duct comprises an expansion tank connection fluidly connecting the coolant duct to the expansion tank, wherein the expansion tank connection is arranged above the inlet when the system is mounted in an intended mounting position on a vehicle. Thereby, conditions are provided for deairing the first and second coolant circuits in an efficient manner via the expansion tank connection.

Optionally, the expansion tank connection is arranged above the outlet when the system is mounted in an intended mounting position on a vehicle. Thereby, air can be evacuated in an efficient manner via the expansion tank connection while flow of air is avoided through the outlet of the coolant duct.

Optionally, the coolant duct is configured to conduct coolant flow along a flow direction having a vector component parallel to a local gravity vector along the full length of the coolant duct when the coolant duct is mounted in an intended mounting position on a vehicle. Thereby, it is ensured that air bubbles can be transported along the full length of the coolant duct in an efficient manner due to gravity and the density difference between the air bubbles and the coolant. Thereby, conditions are provided for deairing the first and second coolant circuits in a further efficient manner.

Optionally, the system comprises a second connecting conduit fluidly connecting the second coolant circuit to the coolant duct. Thereby, a system is provided having improved conditions for mixing coolant of the first and second coolant circuits when wanted simply by controlling the valve to the second state. Thereby, heat energy can be transferred from one of the first and second coolant circuits to the other of the first and second coolant circuits in a more efficient manner. Accordingly, a system is provided capable of managing heat in an improved manner as well as an improved ability to transfer heat between the first and second coolant circuits and components and systems thermally connected to the respective first and second coolant circuits.

As a further result thereof, conditions are provided for designing at least one of the first and second coolant circuits with a lower cooling or heating capacity than would be the case otherwise.

Moreover, due to the second connecting conduit, it can be ensured that the inlets of the pumps of the first and second coolant circuits can be supplied with coolant at the same static pressure, or at least substantially the same static pressure, regardless of whether the valve is in the first or second state. Thereby, cavitation in the pumps of the first and second coolant circuits can be avoided in a simple and efficient manner.

Furthermore, since the second coolant circuit is fluidly connected to the coolant duct of the first coolant circuit via the second connecting conduit and is fluidly connectable to the coolant duct of the first coolant circuit via the first connecting conduit, it can be ensured that the pumps of the first and second coolant circuits can be operated independently without causing any flow disturbances in the other coolant circuit regardless of whether the valve is in the first or second state.

Optionally, the second connecting conduit comprises a flow restrictor. Thereby, unintended and unwanted flow of coolant is avoided through the second connecting conduit when the valve is in the first state, such as a spontaneous mixing of coolant of the first and second coolant circuits.

Optionally, one of the first and second connecting conduits is configured to supply coolant from the coolant duct to the second coolant circuit and the other of the first and second connecting conduits is configured to return coolant from the second coolant circuit to the coolant duct when the valve is in the second state. Thereby, a system is provided having improved conditions for mixing coolant of the first and second coolant circuits when wanted simply by controlling the valve to the second state. In this manner, heat energy can be transferred from one of the first and second coolant circuits to the other of the first and second coolant circuits in an efficient manner. Thereby, a system is provided having an improved ability to transfer heat between the first and second coolant circuits and components and systems thermally connected to the respective first and second coolant circuits.

Moreover, due to these features, it is ensured that the pumps of the first and second coolant circuits can be operated independently without causing any flow disturbances in the other coolant circuit regardless of whether the valve is in the first or second state.

Optionally, the connecting conduit of the first and second connecting conduits which is configured to supply coolant to the second coolant circuit, comprises a connection at the coolant duct located upstream of a connection of the other connecting conduit at the coolant duct relative to an intended flow direction through the coolant duct. Thereby, a more complete mixing of coolant of the first and second coolant circuits is provided when the valve is in the second state while it is ensured that the pumps of the first and second coolant circuits can be operated independently without causing any flow disturbances in the other coolant circuit. Accordingly, a system is provided having improved conditions for mixing coolant of the first and second coolant circuits when wanted simply by controlling the valve to the second state. In this manner, heat energy can be transferred from one of the first and second coolant circuits to the other of the first and second coolant circuits in a more efficient manner.

Thereby, a system is provided having an improved ability to transfer heat between the first and second coolant circuits and components and systems thermally connected to the respective first and second coolant circuits. Moreover, conditions are provided for designing at least one of the first and second coolant circuits with a lower cooling capacity than would be the case otherwise.

Optionally, the second coolant circuit is configured to heat a vehicle occupant compartment. Thereby, the second coolant circuit, which is configured to heat a vehicle occupant compartment, can be deaired in an efficient manner simply by controlling the valve to the second state.

Optionally, the first coolant circuit is configured to cool components of an electric propulsion system. Thereby, a system is provided capable of utilizing the expansion tank of a coolant circuit being configured to cool components of an electric propulsion system for deairing a second coolant circuit.

According to a second aspect of the invention, the object is achieved by a vehicle comprising a vehicle thermal management system according to some embodiments of the present disclosure.

Since the vehicle comprises a thermal management system according to some embodiments, a vehicle is provided having conditions for deairing two coolant circuits via one expansion tank in an efficient manner. Since the two coolant circuits can be deaired using only one expansion tank, a less costly and complex vehicle can be provided. Moreover, conditions are provided for utilizing the available space in the vehicle in a more efficient manner.

Moreover, a vehicle is provided comprising a thermal management system capable of managing heat in an improved manner.

Accordingly, a vehicle is provided overcoming, or at least alleviating, at least some of the above-mentioned problems and drawbacks. As a result, the above-mentioned object is achieved.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
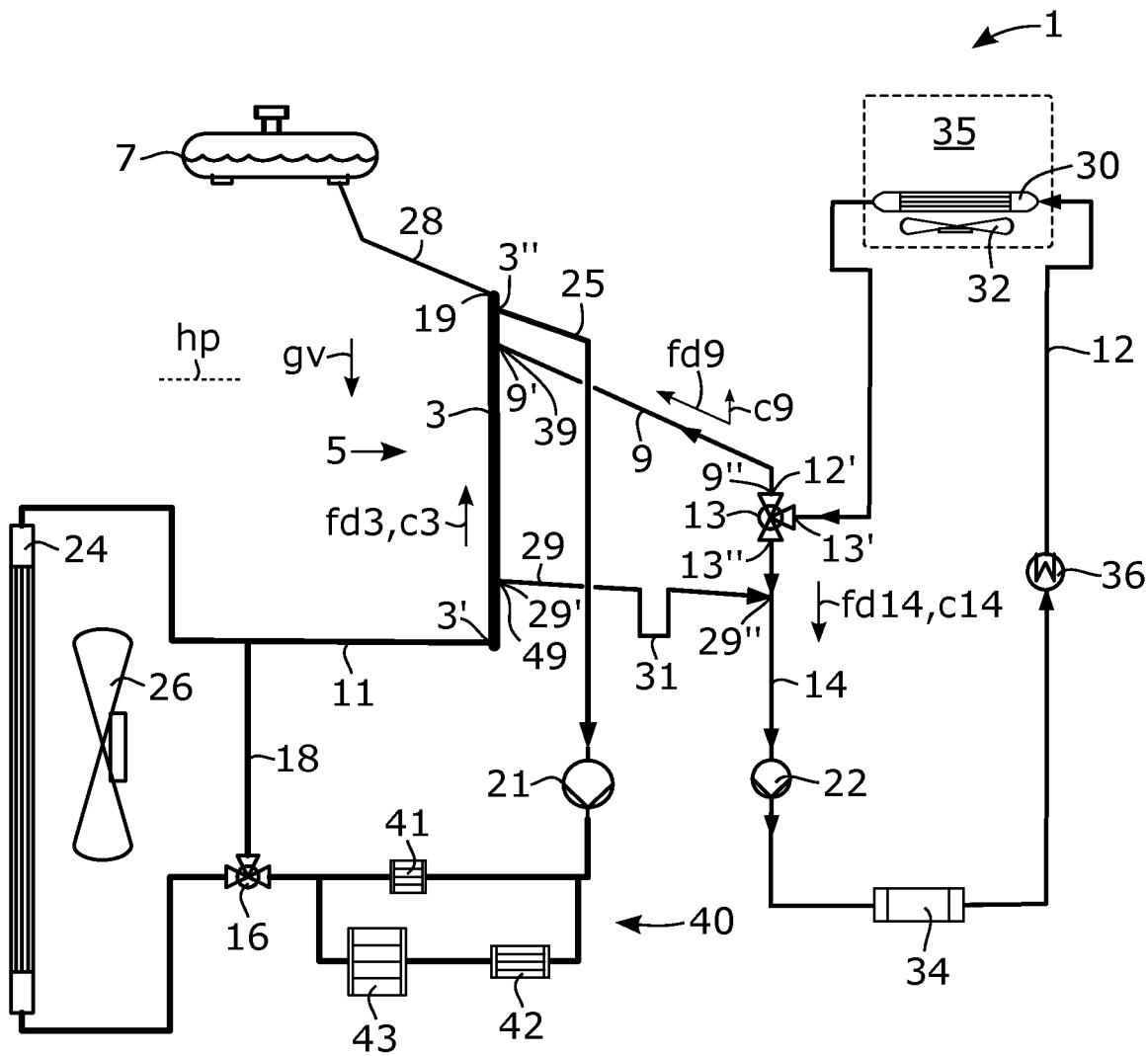
FIG. 1 illustrates a vehicle thermal management system according to some embodiments of the present disclosure.

FIG. 1 illustrates a vehicle thermal management system 1 according to some embodiments of the present disclosure. The vehicle thermal management system 1 is in some places herein referred to as "the thermal management system 1", or simply "the system 1". The system 1 comprises a first and a second coolant circuit 11, 12 each comprising a coolant pump 21, 22. The vehicle thermal management system 1, as referred to herein, may also be referred to as a coolant circuit arrangement 1. Therefore, throughout this disclosure, the wording "vehicle thermal management system 1", "thermal management system 1", or "system 1", may be replaced with the wording "coolant circuit arrangement 1". Moreover, the coolant pump 21 of the first coolant circuit 11 may be referred to as "the first coolant pump 21" and the coolant pump 22 of the second coolant circuit 12 may be referred to as "the second coolant pump 22".

The first and second coolant circuits 11, 12 are separate and independent coolant circuits 11, 12 in the sense that they can operate at different temperature levels, can operate at different flow rate levels, and can operate for different purposes, as is further explained herein. According to the illustrated embodiments, the first coolant circuit 11 is configured to cool components 41, 42, 43 of an electric propulsion system 40. Therefore, according to the illustrated embodiments, the first coolant circuit 11 may be referred to as an electric propulsion cooling circuit. According to further embodiments, the first coolant circuit 11 may be configured to regulate the temperature of one or more other types of components, systems, and/or arrangements, such as an internal combustion engine, a retarder, a waste heat recovery circuit, an occupant compartment, or the like.

According to the illustrated embodiments, the first coolant circuit 11 comprises a radiator 24. The radiator 24 is configured to radiate heat from coolant in the first coolant circuit 11. The radiator 24 may be arranged at a front area of a vehicle comprising the first coolant circuit 11 to be subjected to an air flow generated during driving of the vehicle. Moreover, the radiator 24 may be provided with one or more cooling fans 26 arranged to selectively blow air through the radiator 24. The first coolant circuit 11 is in heat exchanging contact with the components 41, 42, 43 of the electric propulsion system 40. According to the illustrated embodiments, the components 41, 42, 43 of the electric propulsion system 40 comprise an electric machine 41, a propulsion battery 43, and power electronics 42. The first coolant circuit 11 further comprises a thermostatic valve 16 and a bypass line 18. The bypass line 18 bypasses the radiator 24. The thermostatic valve 16 is configured to direct coolant to the radiator 24 or to the bypass line 18. The thermostatic valve 16 may be configured to direct coolant to the radiator 24 or to the bypass line 18 based on the temperature of coolant in the first coolant circuit 11 and/or based on a heating or cooling need of the components 41, 42, 43 of the electric propulsion system 40. The thermostatic valve 16 may comprise a heat sensitive body. As an alternative, or in addition, the thermostatic valve 16 may be electronically controlled.

The first coolant circuit 11 further comprises a coolant duct 3 configured to conduct coolant flow through a portion 5 of the first coolant circuit 11. According to the illustrated embodiments, the coolant duct 3 is arranged downstream of the radiator 24 and downstream of the bypass line 18 relative to an intended flow direction fd3 of coolant through the first coolant circuit 11. In more detail, the coolant duct 3 comprises an inlet 3' connected to the radiator 24 and the bypass line 18 and an outlet 3" connected to the coolant pump 21 of the first coolant circuit 11. The first coolant circuit 11 further comprises an expansion tank 7 connected to the coolant duct 3 via an expansion tank connection 19 of the coolant duct 3. The expansion tank connection 19 of the coolant duct 3 thus fluidly connects the coolant duct 3 to the expansion tank 7.

As indicated in FIG. 1, the coolant duct 3 is configured to conduct coolant flow along a flow direction fd3. The flow direction fd3 has a vector component c3 parallel to a local gravity vector gv along the full length of the coolant duct 3 when the coolant duct 3 is mounted in an intended mounting position on a vehicle and the vehicle is positioned in an intended use position onto a flat horizontal surface. In other words, the angle between the flow direction fd3 and the local gravity vector gv may be within the range of 0 degrees to 90 degrees along the full length of the coolant duct 3 when the coolant duct 3 is mounted in an intended mounting position on a vehicle and the vehicle is positioned in an intended use position onto a flat horizontal surface. In this manner, air bubbles entering the coolant duct 3, for example via the inlet 3' of the coolant duct 3, can be transported to the expansion tank connection 19 in an efficient manner due to gravity and the density difference between the air bubbles and the coolant. That is, since air has a lower density than the coolant, any air bubble will rise due to gravity acting on the coolant surrounding the air bubbles. The intended mounting position, as referred to herein, is a position and orientation of components 3, 9, 13, 21, 22, 28, 14 of the system 1 obtained when the components are mounted to a vehicle, as is further explained herein. Moreover, as is further explained herein, in FIG. 1, some components 3, 9, 13, 21, 22, 28, 14 of the system 1, including the coolant duct 3, are illustrated in a respective position and orientation corresponding to the intended mounting position thereof.

As seen in FIG. 1, according to the illustrated embodiments, the expansion tank connection 19 is arranged at a top portion of the coolant duct 3 relative to the local gravity vector gv. That is, the expansion tank connection 19 is arranged above the inlet 3' of the coolant duct 3 when the coolant duct 3 is mounted in the intended mounting position on a vehicle. Moreover, the expansion tank connection 19 is arranged above the outlet 3" of the coolant duct 3 when the coolant duct 3 is mounted in the intended mounting position on a vehicle. Thereby, air can be evacuated in an efficient manner via the expansion tank connection 19 while flow of air is avoided through the outlet 3" of the coolant duct 3.

The coolant duct 3 may be formed by a pipe comprising a number of connections 3', 3", 39, 19, 49 as is further explained herein. The expansion tank connection 19 of the coolant duct 3 is directly connected to the expansion tank 7 via an expansion tank conduit 28. An inner volume of the coolant duct 3 is thus directly connected to the expansion tank 7 via the expansion tank conduit 28. The expansion tank 7 is arranged at a position higher than the expansion tank connection 19 relative to the local gravity vector gv when the expansion tank is arranged in its intended mounting position on a vehicle. Moreover, the expansion tank conduit 28 is routed such that a flow direction through the expansion tank conduit 28 has a vector component being parallel to the local gravity vector gv along the full length of the expansion tank conduit 28 when the system 1 is mounted in the intended mounting position on a vehicle and the vehicle is positioned in an intended use position onto a flat horizontal surface. In this manner, air bubbles entering the expansion tank conduit 28 can be transported to the expansion tank 7 in an efficient manner due to gravity and the density difference between the air bubbles and the coolant.

The coolant duct 3 may be provided with a greater cross sectional area in a plane perpendicular to the intended flow direction fd3 through the coolant duct 3 than the cross sectional area of other conduit sections of the first coolant circuit 11, such as a conduit section 25 between the outlet 3" of the coolant duct 3 and the coolant pump 21 of the first coolant circuit 11. The coolant duct 3 may be provided with a cross sectional area being at least three times greater than the cross sectional area conduit section 25 between the outlet 3" of the coolant duct 3 and the coolant pump 21 of the first coolant circuit 11. In this manner, a low flow resistance and a low pressure drop is provided through the coolant duct 3. Moreover, a low flow velocity of coolant is obtained through the coolant duct 3. Therefore, the coolant duct 3, as referred to herein, may also be referred to as a "coolant chamber", a "low flow velocity chamber", a "low flow velocity coolant chamber", or the like.

The expansion tank conduit 28, as referred to herein, may also be referred to as a static line. This because during normal operation of the system 1, there is only a low or no flow of fluid through the expansion tank conduit 28. Therefore, throughout this disclosure, the wording "expansion tank conduit" may be replaced with the wording "static line."

Furthermore, according to the illustrated embodiments, the coolant duct 3 is arranged such that the intended flow direction fd3 through the coolant duct 3 is substantially parallel to the local gravity vector gv along the full length of the coolant duct 3. This means that, according to the illustrated embodiments, the coolant duct 3 is positioned in an upright position relative to the local gravity vector gv, in which the coolant duct 3 is substantially parallel to the local gravity vector gv, when being arranged in the intended mounting position on a vehicle. However, as indicated above, the coolant duct 3 may be arranged such that the angle between the intended flow direction fd3 and the local gravity vector gv is within the range of 0 degrees to 90 degrees.

According to the illustrated embodiments, the second coolant circuit 12 is configured to heat a vehicle occupant compartment 35. Therefore, according to the illustrated embodiments, the second coolant circuit 12 may be referred to as an "occupant compartment heating circuit". According to further embodiments, the second coolant circuit 12 may be configured to regulate the temperature of one or more other types of components, systems, and/or arrangements, such as an internal combustion engine, a retarder, a waste heat recovery circuit, an electric propulsion system, a fuel cell, or the like.

According to the illustrated embodiments, the second coolant circuit 12 comprises a heat exchanger 30. The system 1 further comprises a fan 32 configured to generate an airflow through the heat exchanger 30 into the occupant compartment 35. According to further embodiments, the second coolant circuit 12 may comprise one or more radiators arranged in the occupant compartment 35 configured to heat the occupant compartment 35 by convection.

The second coolant circuit 12 is in thermal contact with a heat generating component 34. The heat generating component 34 may for example comprise a combustion engine, an electric machine, a propulsion battery, a liquid cooled condenser, power electronics, or the like. As an alternative, or in addition, the heat generating component 34 may be a condenser of a heat pump circuit. The heat generating component 34 is configured to heat coolant in the second coolant circuit 12 during operation of a vehicle comprising the system 1.

The second coolant circuit 12 further comprises an electrical heater 36. The electrical heater 36 is configured to heat coolant in the second coolant circuit 12 when heat from the heat generating component 34 is insufficient for heating the occupant compartment 35. As seen in FIG. 1, the heat generating component 34 and the electrical heater 36 are arranged between the coolant pump 22 of the second coolant circuit 12 and the heat exchanger 30 of the second coolant circuit 12.

According to embodiments herein, the vehicle thermal management system 1 comprises a first connecting conduit 9. The first connecting conduit 9 connects the second coolant circuit 12 to the coolant duct 3. Moreover, the system 1 comprises a valve 13. The valve 13 is controllable between a first state and a second state. In the first state, the valve 13 hinders, i.e. blocks, flow of fluid through the first connecting conduit 9. In the second state, the valve 13 allows flow of fluid through the first connecting conduit 9 to deair the second coolant circuit 12 via the expansion tank 7. In this manner, the second coolant circuit 12 can be deaired via the coolant duct 3 of the first coolant circuit 11 simply by controlling the valve 13 to the second state, as is further explained herein.

As indicated in FIG. 1, the first connecting conduit 9 comprises a first end 9' connected to the coolant duct 3 and a second end 9" connected to the second coolant circuit 12. According to the illustrated embodiments, the first end 9' is arranged above the second end 9" when the system 1 is mounted in the intended mounting position on a vehicle. Moreover, according to the illustrated embodiments, the first connecting conduit 9 is routed such that an intended flow direction fd9 through the first connecting conduit 9 has a vector component c9 parallel to a local gravity vector gv along the full length of the first connecting conduit 9 when the system 1 is mounted in the intended mounting position on a vehicle and the vehicle is positioned in an intended use position onto a flat horizontal surface. In other words, the angle between the flow direction fd9 and the local gravity vector gv may be within the range of 0 degrees to 90 degrees along the full length of the first connecting conduit 9 when the first connecting conduit 9 is mounted in an intended mounting position on a vehicle and the vehicle is positioned in an intended use position onto a flat horizontal surface. In this manner, air bubbles entering the first connecting conduit 9 can be transported along the full length of the first connecting conduit 9 in an efficient manner due to gravity and the density difference between the air bubbles and the coolant. Moreover, due to these features, filling of coolant into the system 1 is facilitated, for example during assembly, service, and repair of the system 1.

As seen in FIG. 1, according to the illustrated embodiments, the second end 9" of the first connecting conduit 9 is connected to the second coolant circuit 12 via a connection 12' arranged above the coolant pump 22 of the second coolant circuit 12 when the system 1 is mounted in the intended mounting position on a vehicle. Moreover, the second coolant circuit 12 comprises a conduit section 14 between the connection 12' and the coolant pump 22 of the second coolant circuit 12. The connection 12' between the second end 9" of the first connecting conduit 9 and the second coolant circuit 12 is arranged upstream of the coolant pump 22 of the second coolant circuit 12 relative to an intended flow direction fd14 through the second coolant circuit 12. The conduit section 14 is routed such that an intended flow direction fd14 through the conduit section 14 has a vector component c14 parallel to a local gravity vector gv along the full length of the conduit section 14 when the system 1 is mounted in the intended mounting position on a vehicle and the vehicle is positioned in an intended use position onto a flat horizontal surface. In other words, the angle between the flow direction fd14 and the local gravity vector gv may be within the range of 0 degrees to 90 degrees along the full length of the conduit section 14 when the system 1 is mounted in an intended mounting position on a vehicle and the vehicle is positioned in an intended use position onto a flat horizontal surface. In this manner, the coolant pump 22 of the second coolant circuit 12 can be deaired in an efficient manner simply by controlling the valve 13 to the second state. Furthermore, it can be ensured that coolant is reaching the coolant pump 22 of the second coolant circuit 12 when filling the system 1 with coolant. Accordingly, due to these features, filling of coolant into the system 1 is facilitated, for example during assembly, service, and repair of the system 1.

As indicated above, the system 1 comprises a conduit section 25 between the outlet 3" of the coolant duct 3 and the coolant pump 21 of the first coolant circuit 11. As seen in FIG. 1, the outlet 3" of the coolant duct 3 is arranged above the coolant pump 21 of the first coolant circuit 11 when the system 1 is mounted in the intended mounting position on a vehicle. Moreover, the outlet 3" of the coolant duct 3 is arranged upstream of the coolant pump 21 of the first coolant circuit 11 relative to an intended flow direction through the first coolant circuit 11. The conduit section 25 between the outlet 3" of the coolant duct 3 and the coolant pump 21 of the first coolant circuit 11 is routed such that an intended flow direction through the conduit section 25 has a vector component parallel to a local gravity vector gv along the full length of the conduit section 25 when the system 1 is mounted in the intended mounting position on a vehicle and the vehicle is positioned in an intended use position onto a flat horizontal surface. In other words, the angle between the intended flow direction through the conduit section 25 and the local gravity vector gv may be within the range of 0 degrees to 90 degrees along the full length of the conduit section 25 when the system 1 is mounted in an intended mounting position on a vehicle and the vehicle is positioned in an intended use position onto a flat horizontal surface In this manner, the coolant pump 21 of the first coolant circuit 11 is deaired in an efficient manner via the coolant duct 3. Furthermore, it can be ensured that coolant is reaching the coolant pump 21 of the first coolant circuit 11 when filling the system 1 with coolant. Accordingly, due to these features, filling of coolant into the system 1 is facilitated, for example during assembly, service, and repair of the system 1.

Moreover, as seen in FIG. 1, according to the illustrated embodiments, the first end 9' of the first connecting conduit 9 is connected to the coolant duct 3 at a location below the expansion tank connection 19 relative to the local gravity vector gv when the system 1 is mounted in the intended mounting position on a vehicle. In this manner, air bubbles entering the coolant duct 3 from the first connecting conduit 9 can be transported in an efficient manner to the expansion tank connection 19 due to gravity and the density difference between the air bubbles and the coolant.

According to the illustrated embodiments, the connection 12' between the first connecting conduit 9 and the second coolant circuit 12 is an outlet 12' of the valve 13. That is, according to the embodiments illustrated in FIG. 1, the valve 13 is a three-way valve 13 comprising a one inlet 13' and two outlets 12', 13'. According to further embodiments, the valve 13, as referred to herein, may be a two-way valve positioned in the first connecting conduit 9 or at the first or second end 9', 9" of the first connecting conduit 9. Moreover, according to some further embodiments of the present disclosure, the valve 13 may be a three-way valve comprising two inlets and one outlet, as is further explained herein.

According to the embodiments illustrated in FIG. 1, the valve 13 comprises an inlet 13' connected to the heat exchanger 30 of the second coolant circuit 12. Moreover, the valve 13 comprises a first outlet 13" connected to the conduit section 14 between the valve 13 and the coolant pump 22 of the second coolant circuit 12. The valve 13 further comprises a second outlet 12' connected to the second end 9" of the first connecting conduit 9. The second outlet 12' of the valve 13 is in some places herein referred to as the connection 12' between the first connecting conduit 9 and the second coolant circuit 12.

In the first state, the valve 13 opens a fluid connection between the inlet 13' and the first outlet 13" and closes a fluid connection between the inlet 13' and the second outlet 12'. Thereby, the valve 13 hinders flow of fluid, i.e. coolant, through the first connecting conduit 9 when the valve 13 is in the first state. In this manner, the coolant pump 22 of the second coolant circuit 12 can pump coolant through the heat generating component 34, the electrical heater 36 and the heat exchanger 35 into the valve 13 via the inlet 13' and out from the valve 13 via the first outlet 13" to the coolant pump 22 when the valve 13 is in the first state. The second coolant circuit 12 can be said to be isolated from the first coolant circuit 11 when the valve 13 is in the first state. This because the coolant pump 22 of the second coolant circuit 12 can pump coolant through the second coolant circuit 12 without any mixing of coolant between the first and second coolant circuits 11, 12.

According to the illustrated embodiments, the second state of the valve 13, as referred to herein, is a state in which the valve 13 opens a fluid connection between the inlet 13' and the second outlet 12' of the valve 13 and closes a fluid connection between the inlet 13' and the first outlet 13" of the valve 13. According to further embodiments, second state of the valve 13, as referred to herein, may be a state in which the valve 13 at least partially opens a fluid connection between the inlet 13' and the first and second outlets 12', 13" of the valve 13.

As seen in FIG. 1, according to the illustrated embodiments, the system 1 comprises a second connecting conduit 29 fluidly connecting the second coolant circuit 12 to the coolant duct 3. According to the embodiments illustrated in FIG. 1, the second connecting conduit 29 is configured to return coolant from the coolant duct 3 to the second coolant circuit 12 when the valve 13 is in the second state. Accordingly, as understood from the above, the first connecting conduit 9 is configured to supply coolant to the coolant duct 3 and the second connecting conduit 29 is configured to return coolant from the coolant duct 3 when the valve 13 is in the second state. Moreover, according to the illustrated embodiments, the coolant duct 3 is provided with a greater cross sectional area in a plane perpendicular to the intended flow direction fd3 through the coolant duct 3 than the cross sectional area of other conduit sections of the first coolant circuit 11. Due to these features, it is ensured that the pumps 21, 22 of the first and second coolant circuits 11, 12 can be operated independently without causing any flow disturbances in the other coolant circuit 11, 12 also when the valve 13 is in the second state.

According to embodiments illustrated in FIG. 1, the second connecting conduit 29 comprises a first end 29' connected to the coolant duct 3 at a location upstream of the connection 39 of the first connecting conduit 9 at the coolant duct 3 relative to an intended flow direction fd3 through the coolant duct 3. The first end 29' of the second connecting conduit 29 is connected to the coolant duct 3 via a connection 49. Moreover, the second connecting conduit 29 comprises a second end 29" connected to the conduit section 14 between the valve 13 and the coolant pump 22 of the second coolant circuit 12. Due to these features, coolant being pumped into the coolant duct 3 via the first connecting conduit 9 flows through the first coolant circuit 11 before flowing back to the second coolant circuit 12 via the second connecting conduit 29, when the valve 13 is in the second state. In this manner, a substantially complete mixing of coolant of the first and second coolant circuits 11, 12 is provided when the valve 13 is in the second state, which can be utilized to transfer heat or cold between the first and second coolant circuits 11, 12 in an efficient manner by controlling the valve 13 to the second state.

According to further embodiments, the second connecting conduit 29 may comprise a first end 29' connected to the coolant duct 3 at a location downstream of the connection 39 of the first connecting conduit 9 at the coolant duct 3 relative to an intended flow direction fd3 through the coolant duct 3. According to such embodiments, an at least partial mixing of coolant of the first and second coolant circuits 11, 12 can be provided in the coolant duct 3 when the valve 13 is in the second state, which can be utilized to transfer heat or cold between the first and second coolant circuits 11, 12 by controlling the valve 13 to the second state.

Accordingly, due to the features of the system 1, the second coolant circuit 12 can be deaired in an efficient manner via the first connecting conduit 9 while conditions are provided for transferring heat between the first and second coolant circuits 11, 12 and components and systems 24, 30, 41, 42, 43 thermally connected to the respective first and second coolant circuits 11, 12. As a result thereof, a system 1 is provided capable of managing heat in an improved manner. In other words, a system 1 is provided in which the first and second coolant circuits 11, 12 are allowed to operate independently regarding coolant temperature when the valve 13 is in the first state, while conditions are provided for deairing the second coolant circuit 12 and transferring heat between the first and second coolant circuits 11, 12 in an efficient manner when the valve 13 is in the second state.

The system 1 may comprise a control arrangement configured to control the opening state of the valve 13, i.e. control the valve 13 between the first and second states. The control arrangement may be further configured to control operation of one or both of the coolant pumps 21, 22 of the first and second coolant circuits 11, 12. Such a control arrangement is not illustrated in FIG. 1 for the reason of brevity and clarity. The control arrangement may be configured to control the valve 13 to the second state when it is desired to deair the second coolant circuit 12, such as when air is estimated to be present in the second coolant circuit 12. As an example, air can be estimated to be present in the second coolant circuit 12 after assembly, service, or repair of the system 1. As an alternative, or in addition, the control arrangement may be configured to control the valve 13 to the second state when it is desired to transfer heat between the first and second coolant circuits 11, 12. According to the illustrated embodiments, it may be desired to transfer heat from the first coolant circuit 11 to the second coolant circuit 12 when there is a high heating need of the occupant compartment 35 and the coolant temperature in the first coolant circuit 11 is high and the coolant temperature in the second coolant circuit 12 is low. Thus, in such situations, the control arrangement may control the valve 13 to the second state, and as a result thereof, the heat of the coolant of the first coolant circuit 11 can be utilized for heating the occupant compartment 35.

According to the illustrated embodiments, the second connecting conduit 29 comprises a flow restrictor 31. The flow restrictor 31 prevents mixing of coolant between the first and second coolant circuits 11, 12 when the valve 13 is in the first state. According to the illustrated embodiments, the flow restrictor 31 comprises an anti-mixing loop. The anti-mixing loop comprises a flow path routed such that mixing caused by temperature differences between coolant of the first and second coolant circuits 11, 12 is avoided. As an alternative, or in addition, the flow restrictor 31 may comprise another type of component configured to prevent mixing of coolant between the first and second coolant circuits 11, 12 when the valve 13 is in the first state, such as a one-way valve, a non-return valve, a check valve, or the like.

In FIG. 1, a horizontal plane hp and a local gravity vector gv are illustrated. The local gravity vector gv is representative of a local gravity vector gv at the location of the system 1. The horizontal plane hp is perpendicular to the local gravity vector gv, i.e. the normal to the horizontal plane hp is parallel to the local gravity vector gv. The components of the system 1 are configured to be mounted in an intended mounting position on a vehicle. In FIG. 1, the coolant duct 3, the first connecting conduit 9, the valve 13, the coolant pump 21 of the first coolant circuit 11, the coolant pump 22 of the second coolant circuit 12, the expansion tank conduit 28, the conduit section 25 between the outlet 3" of the coolant duct 3 and the coolant pump 21 of the first coolant circuit 11, and the conduit section 14 between the valve 13 and the coolant pump 22 of the second coolant circuit 12 are illustrated in a respective position and orientation corresponding to an intended mounting position thereof.

Since the vector components c3, c9, c14 referred to herein, are parallel to a local gravity vector gv, the vector components c3, c9, c14 may also be referred to as vertical vector components. The feature that a vector component c3, c9, c14 is parallel to a local gravity vector gv along the full length of a fluid conduction element 3, 9, 25, 28 means that the vector component c3, c9, c14 does not change its vertical direction from a first vertical direction to a second vertical direction, wherein the second vertical direction is opposite to the first vertical direction, along the full length of a fluid conducting element 3, 9, 25, 28.

Figure 2:
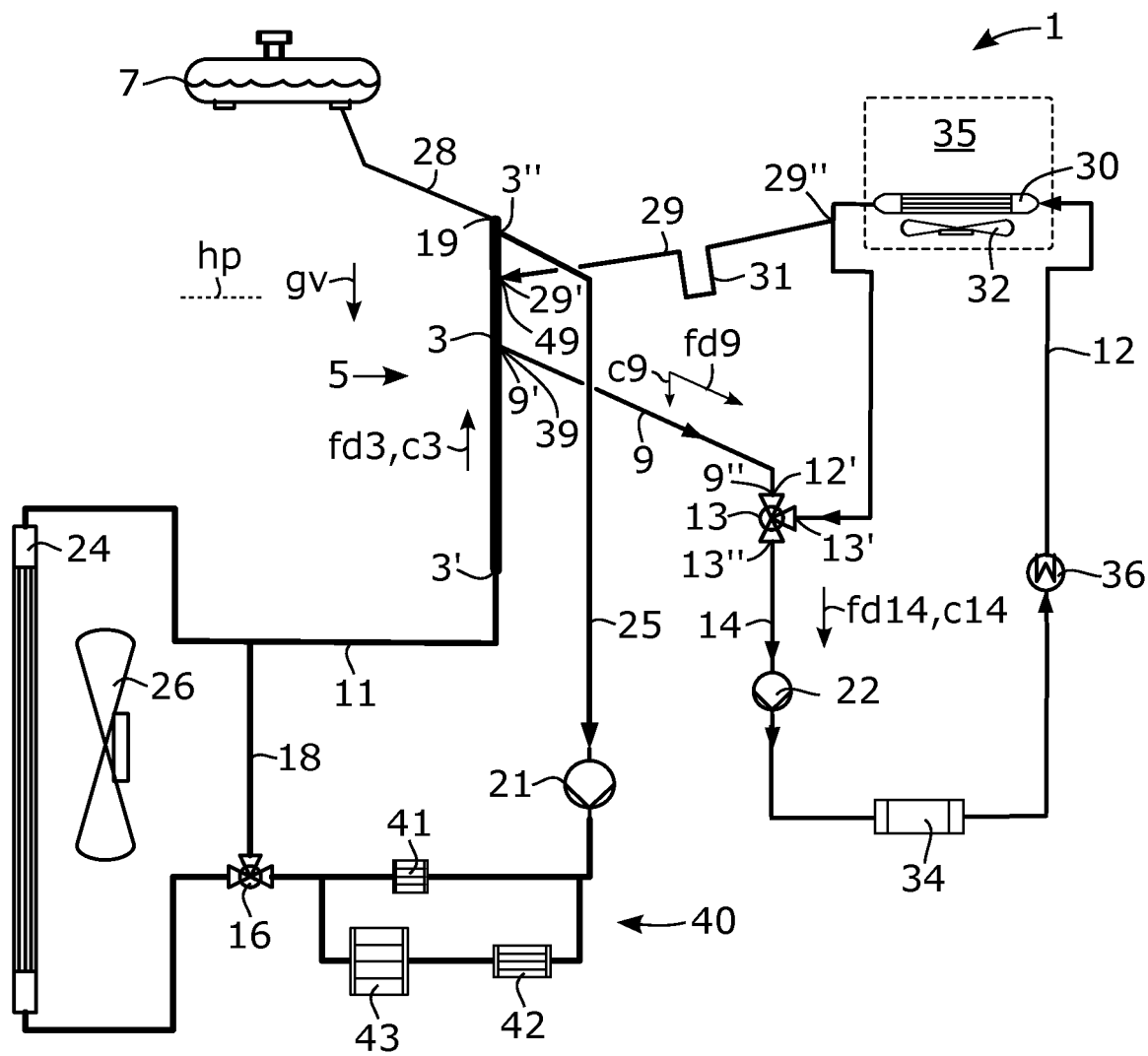
FIG. 2 illustrates a vehicle thermal management system according to some further embodiments of the present disclosure.

FIG. 2 illustrates a vehicle thermal management system 1 according to some further embodiments of the present disclosure. The thermal management system 1 illustrated in FIG. 2 comprises the same features, functions, and advantages as the thermal management system 1 explained with reference to FIG. 1, with some differences explained below.

According to the embodiments illustrated in FIG. 2, the first connecting conduit 9 is configured to return coolant from the coolant duct 3 to the second coolant circuit 12 and the second connecting conduit 29 is configured to supply coolant from the second coolant circuit 12 to the coolant duct 3 when the valve 13 is in the second state. Moreover, according to the embodiments illustrated in FIG. 2, the connection 12' between the first connecting conduit 9 and the second coolant circuit 12 is an inlet 12' of the valve 13. That is, according to the embodiments illustrated in FIG. 1, the valve 13 is a three-way valve 13 comprising two inlets 13', 12' and one outlet 13". According to further embodiments, the valve 13 may be a two-way valve positioned in the first connecting conduit 9 or at the first or second end 9', 9" of the first connecting conduit 9.

According to the embodiments illustrated in FIG. 2, the valve 13 comprises a first inlet 13' connected to the heat exchanger 30 of the second coolant circuit 12. Moreover, the valve 13 comprises an outlet 13" connected to the conduit section 14 between the valve 13 and the coolant pump 22 of the second coolant circuit 12. The valve 13 further comprises a second inlet 12' connected to the second end 9" of the first connecting conduit 9.

Also in these embodiments, the valve 13 is controllable between a first state and a second state. In the first state, the valve 13 opens a fluid connection between the first inlet 13' and the outlet 13" and closes a fluid connection between the second inlet 12' and the outlet 13". Thereby, the valve 13 hinders flow of fluid through the first connecting conduit 9 when the valve 13 is in the first state. In this manner, the coolant pump 22 of the second coolant circuit 12 can pump coolant through the heat generating component 34, the electrical heater 36 and the heat exchanger 35 into the valve 13 via the first inlet 13' and out from the valve 13 via the outlet 13" to the coolant pump 22 when the valve 13 is in the first state. The second coolant circuit 12 can be said to be isolated from the first coolant circuit 11 when the valve 13 is in the first state. This because the coolant pump 22 of the second coolant circuit 12 can pump coolant through the second coolant circuit 12 without any mixing of coolant between the first and second coolant circuits 11, 12.

According to the embodiments illustrated in FIG. 2, the second state of the valve 13 is a state in which the valve 13 opens a fluid connection between the second inlet 12' and the outlet 13" of the valve 13 and closes a fluid connection between the first inlet 13' and the outlet 13" of the valve 13. According to further embodiments, second state of the valve 13, as referred to herein, may be a state in which the valve 13 at least partially opens a fluid connection between the first and second inlets 12', 13' and the outlet 13" of the valve 13.

As seen in FIG. 2, the second connecting conduit 29 comprises a first end 29' connected to the coolant duct 3 and a second end 29" connected to the second coolant circuit 12. The second end 29" of the second connecting conduit 29 is connected to the second coolant circuit 12 at a location between the heat exchanger 30 and the valve 13. In this manner, the first connecting conduit 9 will return coolant from the coolant duct 3 to the second coolant circuit 12 and the second connecting conduit 29 is configured to supply coolant from the second coolant circuit 12 to the coolant duct 3 when the valve 13 is in the second state. Thereby, it is ensured that the pumps 21, 22 of the first and second coolant circuits 11, 12 can be operated independently without causing any flow disturbances in the other coolant circuit 11, 12 also when the valve 13 is in the second state.

According to the embodiments illustrated in FIG. 2, the first end 29' of the second connecting conduit 29 is connected to the coolant duct 3 at a location downstream of the connection 39 of the first connecting conduit 9 at the coolant duct 3 relative to an intended flow direction fd3 through the coolant duct 3. Due to these features, coolant being pumped into the coolant duct 3 via the second connecting conduit 29 flows through the first coolant circuit 11 before flowing back to the second coolant circuit 12 via the first connecting conduit 9, when the valve 13 is in the second state. In this manner, a substantially complete mixing of coolant of the first and second coolant circuits 11, 12 is provided when the valve 13 is in the second state, which can be utilized to transfer heat or cold between the first and second coolant circuits 11, 12 by controlling the valve 13 to the second state.

According to further embodiments, the second connecting conduit 29 may comprise a first end 29' connected to the coolant duct 3 at a location upstream of the connection 39 of the first connecting conduit 9 at the coolant duct 3 relative to an intended flow direction fd3 through the coolant duct 3. According to such embodiments, an at least partial mixing of coolant of the first and second coolant circuits 11, 12 can be provided in the coolant duct 3 when the valve 13 is in the second state, which can be utilized to transfer heat or cold between the first and second coolant circuits 11, 12 by controlling the valve 13 to the second state.

Also in these embodiments, the first connecting conduit 9 comprises a first end 9' connected to the coolant duct 3 and a second end 9" connected to the second coolant circuit 12. The first end 9' is arranged above the second end 9" when the system 1 is mounted in the intended mounting position on a vehicle. Moreover, the first connecting conduit 9 is routed such that an intended flow direction fd9 through the first connecting conduit 9 has a vector component c9 parallel to a local gravity vector gv along the full length of the first connecting conduit 9 when the system 1 is mounted in the intended mounting position on a vehicle and the vehicle is positioned in an intended use position onto a flat horizontal surface. In other words, the angle between the flow direction fd9 and the local gravity vector gv may be within the range of 0 degrees to 90 degrees along the full length of the first connecting conduit 9 when the first connecting conduit 9 is mounted in an intended mounting position on a vehicle and the vehicle is positioned in an intended use position onto a flat horizontal surface. In this manner, air bubbles entering the first connecting conduit 9 can be transported along the full length of the first connecting conduit 9 in an efficient manner due to gravity and the density difference between the air bubbles and the coolant. Moreover, due to these features, filling of coolant into the system 1 is facilitated, for example during assembly, service, and repair of the system 1.

As a result of these features, the second coolant circuit 12 can be deaired in an efficient manner via the first connecting conduit 9 while conditions are provided for transferring heat between the first and second coolant circuits 11, 12 and components and systems 24, 30, 41, 42, 43 thermally connected to the respective first and second coolant circuits 11, 12. As a result thereof, a system 1 is provided capable of managing heat in an improved manner. In other words, a system 1 is provided in which the first and second coolant circuits 11, 12 are allowed to operate independently regarding coolant temperature when the valve 13 is in the first state, while conditions are provided for deairing the second coolant circuit 12 and transferring heat between the first and second coolant circuits 11, 12 in an efficient manner when the valve 13 is in the second state.

Moreover, also in these embodiments, the second connecting conduit 29 comprises a flow restrictor 31. The flow restrictor 31 prevents mixing of coolant between the first and second coolant circuits 11, 12 when the valve 13 is in the first state. According to the illustrated embodiments, the flow restrictor 31 comprises an anti-mixing loop. The anti-mixing loop comprises a flow path routed such that mixing caused by temperature differences between coolant of the first and second coolant circuits 11, 12 is avoided. As an alternative, or in addition, the flow restrictor 31 may comprise another type of component configured to prevent mixing of coolant between the first and second coolant circuits 11, 12 when the valve 13 is in the first state, such as a one-way valve, a non-return valve, a check valve, or the like.

In FIG. 2, a horizontal plane hp and a local gravity vector gv are illustrated. The local gravity vector gv is representative of a local gravity vector gv at the location of the system 1. The horizontal plane hp is perpendicular to the local gravity vector gv, i.e. the normal to the horizontal plane hp is parallel to the local gravity vector gv. The components of the system 1 are configured to be mounted in an intended mounting position on a vehicle. In FIG. 2, the coolant duct 3, the first connecting conduit 9, the valve 13, the coolant pump 21 of the first coolant circuit 11, the coolant pump 22 of the second coolant circuit 12, the expansion tank conduit 28, the conduit section 25 between the outlet 3" of the coolant duct 3 and the coolant pump 21 of the first coolant circuit 11, and the conduit section 14 between the valve 13 and the coolant pump 22 of the second coolant circuit 12 are illustrated in a respective position and orientation corresponding to an intended mounting position thereof.

Figure 3:
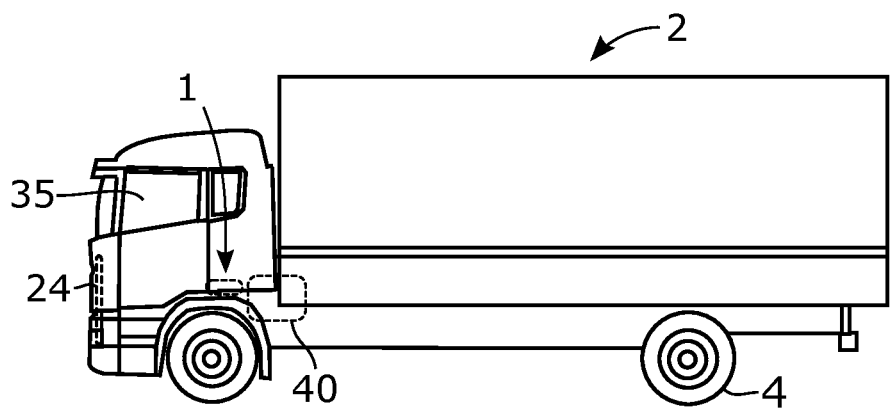
FIG. 3 illustrates a vehicle according to some embodiments.

FIG. 3 illustrates a vehicle 2 according to some embodiments. The vehicle 2 may comprise a vehicle thermal management system 1 according to the embodiments illustrated in FIG. 1, or a vehicle thermal management system 1 according to the embodiments illustrated in FIG. 2. In FIG. 3, the radiator 24 of the first coolant circuit of the system 1 is indicated.

The vehicle 2 comprises an electric propulsion system 40. The electric propulsion system 40 is configured to provide motive power to the vehicle 2 via wheels 4 of the vehicle 2. The first coolant circuit of the system 1 may be configured to regulate the temperature of one or more components of the electric propulsion system 40 of the vehicle 2. In FIG. 3, an occupant compartment 35 is indicated. The second coolant circuit of the system 1 may be configured to heat the occupant compartment 35.

According to the illustrated embodiments, the vehicle 2 is a truck. However, according to further embodiments, the vehicle 2, as referred to herein, may be another type of manned or unmanned vehicle for land or water based propulsion such as a lorry, a bus, a construction vehicle, a tractor, a car, a ship, a boat, or the like.

Moreover, according to further embodiments, the vehicle 2 may comprise an internal combustion engine, for example a compression ignition engine, such as a diesel engine, or an Otto engine with a spark-ignition device, wherein the Otto engine may be configured to run on gas, petrol, alcohol, similar volatile fuels, or combinations thereof. According to such embodiments, the first coolant circuit of the system 1 may be configured to regulate the temperature of the internal combustion engine and/or one or more components of the internal combustion engine.

The control arrangement, as referred to herein, may comprise a calculation unit which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression "calculation unit" may represent a processing circuitry comprising a plurality of processing circuits, such as, e.g., any, some or all of the ones mentioned above.

The control arrangement may further comprise a memory unit, wherein the calculation unit may be connected to the memory unit, which may provide the calculation unit with, for example, stored program code and/or stored data which the calculation unit may need to enable it to do calculations. The calculation unit may also be adapted to store partial or final results of calculations in the memory unit. The memory unit may comprise a physical device utilised to store data or programs, i.e., sequences of instructions, on a temporary or permanent basis. According to some embodiments, the memory unit may comprise integrated circuits comprising silicon-based transistors. The memory unit may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

The control arrangement may be connected to components of the system 1 for receiving and/or sending input and output signals. These input and output signals may comprise waveforms, pulses, or other attributes which the input signal receiving devices can detect as information and which can be converted to signals processable by the control arrangement. These signals may then be supplied to the calculation unit. One or more output signal sending devices may be arranged to convert calculation results from the calculation unit to output signals for conveying to other parts of the vehicle's control system and/or the component or components for which the signals are intended. Each of the connections to the respective components of the system 1 for receiving and sending input and output signals may take the form of one or more from among a cable, a data bus, e.g. a CAN (controller area network) bus, a MOST (media orientated systems transport) bus or some other bus configuration, or a wireless connection.

The control arrangement, as referred to herein, may be implemented wholly or partly in two or more control arrangements or two or more control units. Control systems in modern vehicles generally comprise a communication bus system consisting of one or more communication buses for connecting a number of electronic control units (ECUs), or controllers, to various components on board the vehicle. Such a control system may comprise a large number of control units and taking care of a specific function may be shared between two or more of them. Vehicles of the type here concerned are therefore often provided with significantly more control arrangements as one skilled in the art will surely appreciate.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A vehicle thermal management system comprising:
   a first and a second coolant circuit each comprising a coolant pump,
   wherein the first coolant circuit comprises:
      a coolant duct configured to conduct coolant flow through a portion of the first coolant circuit; and
      an expansion tank connected to the coolant duct;
      a first connecting conduit connecting the second coolant circuit to the coolant duct of the first coolant circuit; and
      a valve controllable between a first state in which the valve hinders flow of fluid through the first connecting conduit, and a second state in which the valve allows flow of fluid through the first connecting conduit and through at least a portion of the coolant duct and thereafter to the expansion tank to deair the second coolant circuit via the expansion tank,
      wherein the first connecting conduit comprises a first end and a second end, wherein the second end is connected to the second coolant circuit via a connection arranged upstream of the coolant pump of the second coolant circuit relative to an intended flow direction through the second coolant circuit.

2. The system according to claim 1, wherein the first connecting conduit comprises the first end connected to the coolant duct, wherein the first end is arranged above the second end when the system is mounted in an intended mounting position on a vehicle.

3. The system according to claim 1, wherein the first connecting conduit is routed such that an intended flow direction through the first connecting conduit has a vector component parallel to a local gravity vector along the full length of the first connecting conduit when the system is mounted in an intended mounting position on a vehicle.

4. The system according to claim 1, wherein the first connecting conduit comprises the second end connected to the second coolant circuit via a connection arranged above the coolant pump of the second coolant circuit when the system is mounted in an intended mounting position on a vehicle.

5. The system according to claim 4, wherein the second coolant circuit comprises a conduit section between the connection and the coolant pump of the second coolant circuit, and wherein the conduit section is routed such that an intended flow direction through the conduit section has a vector component parallel to a local gravity vector along the full length of the conduit section when the system is mounted in an intended mounting position on a vehicle.

6. The system according to claim 1, wherein the coolant duct comprises an expansion tank connection fluidly connecting the coolant duct to the expansion tank, and wherein the first connecting conduit is connected to the coolant duct at a location below the expansion tank connection when the system is mounted in an intended mounting position on a vehicle.

7. The system according to claim 1, wherein the coolant duct comprises an inlet and an outlet each connected to the first coolant circuit, and wherein the coolant duct comprises an expansion tank connection fluidly connecting the coolant duct to the expansion tank, wherein the expansion tank connection is arranged above the inlet when the system is mounted in an intended mounting position on a vehicle.

8. The system according to claim 7, wherein the expansion tank connection is arranged above the outlet when the system is mounted in an intended mounting position on a vehicle.

9. The system according to claim 1, wherein the coolant duct is configured to conduct coolant flow along a flow direction having a vector component parallel to a local gravity vector along the full length of the coolant duct when the coolant duct is mounted in an intended mounting position on a vehicle.

10. The system according to claim 1, wherein the system comprises a second connecting conduit fluidly connecting the second coolant circuit to the coolant duct.

11. The system according to claim 10, wherein the second connecting conduit comprises a flow restrictor.

12. The system according to claim 10, wherein one of the first and second connecting conduits is configured to supply coolant from the coolant duct to the second coolant circuit and the other of the first and second connecting conduits is configured to return coolant from the second coolant circuit to the coolant duct when the valve is in the second state.

13. The system according to claim 12, wherein the connecting conduit of the first and second connecting conduits which is configured to supply coolant to the second coolant circuit comprises a connection at the coolant duct located upstream of a connection of the other connecting conduit at the coolant duct relative to an intended flow direction through the coolant duct.

14. The system according to claim 1, wherein the valve is controllable to selectively connect the first connecting conduit to the coolant duct to allow flow of fluid from the second coolant circuit fluid through the first connecting conduit and through at least a portion of the coolant duct and thereafter to the expansion tank, such that the coolant duct is selectively used to deair both the first and second coolant circuits via the expansion tank using the valve.

15. The system according to claim 1, wherein the second end of the first connecting conduit is connected to the second coolant circuit via a connection arranged upstream of the coolant pump of the second coolant circuit and downstream of a heat exchanger of the second coolant circuit.

16. The system according to claim 1 further comprising a second connecting conduit fluidly connecting the second coolant circuit to the coolant duct, wherein the second end of the first connecting conduit is connected to the second coolant circuit via a connection arranged: (i) upstream of the coolant pump of the second coolant circuit, (ii) upstream of the connection of the second connecting conduit to the second coolant circuit, and (iii) downstream of a heat exchanger of the second coolant circuit.

17. A vehicle comprising a vehicle thermal management system comprising:
a first and a second coolant circuit each comprising a coolant pump,
wherein the first coolant circuit comprises:
a coolant duct configured to conduct coolant flow through a portion of the first coolant circuit; and
an expansion tank connected to the coolant duct;
a first connecting conduit connecting the second coolant circuit to the coolant duct of the first coolant circuit; and
a valve controllable between a first state in which the valve hinders flow of fluid through the first connecting conduit, and a second state in which the valve allows flow of fluid through the first connecting conduit and through at least a portion of the coolant duct and thereafter to the expansion tank to deair the second coolant circuit via the expansion tank,
wherein the first connecting conduit comprises a first end and a second end, wherein the second end is connected to the second coolant circuit via a connection arranged upstream of the coolant pump of the second coolant circuit relative to an intended flow direction through the second coolant circuit.

18. The vehicle according to claim 17, wherein the valve is controllable to selectively connect the first connecting conduit to the coolant duct to allow flow of fluid from the second coolant circuit fluid through the first connecting conduit and through at least a portion of the coolant duct and thereafter to the expansion tank, such that the coolant duct is selectively used to deair both the first and second coolant circuits via the expansion tank using the valve.

19. A vehicle thermal management system comprising:
a first and a second coolant circuit each comprising a coolant pump, wherein the first coolant circuit comprises: a coolant duct configured to conduct coolant flow through a portion of the first coolant circuit; and an expansion tank connected to the coolant duct;
a first connecting conduit connecting the second coolant circuit to the coolant duct of the first coolant circuit;
a valve controllable between a first state in which the valve hinders flow of fluid through the first connecting conduit, and a second state in which the valve allows flow of fluid through the first connecting conduit and through at least a portion of the coolant duct and thereafter to the expansion tank to deair the second coolant circuit via the expansion tank; and
a second connecting conduit fluidly connecting the second coolant circuit to the coolant duct, wherein the second connecting conduit is configured to supply coolant from the coolant duct to the second coolant circuit and the first connecting conduit is configured to return coolant from the second coolant circuit to the coolant duct when the valve is in the second state.

20. A vehicle comprising a vehicle thermal management system comprising:

a first and a second coolant circuit each comprising a coolant pump, wherein the first coolant circuit comprises: a coolant duct configured to conduct coolant flow through a portion of the first coolant circuit; and an expansion tank connected to the coolant duct;

a first connecting conduit connecting the second coolant circuit to the coolant duct of the first coolant circuit;

a valve controllable between a first state in which the valve hinders flow of fluid through the first connecting conduit, and a second state in which the valve allows flow of fluid through the first connecting conduit and through at least a portion of the coolant duct and thereafter to the expansion tank to deair the second coolant circuit via the expansion tank; and a second connecting conduit fluidly connecting the second coolant circuit to the coolant duct, wherein the second connecting conduit is configured to supply coolant from the coolant duct to the second coolant circuit and the first connecting conduit is configured to return coolant from the second coolant circuit to the coolant duct when the valve is in the second state.

* * * * *